United States Patent [19]

Hekkanen et al.

[11] E Re. 29,413

[45] Reissued Sept. 27, 1977

[54] METHOD AND APPARATUS FOR FABRICATING AN OFF-SHORE STRUCTURE

[75] Inventors: Eero M. Hekkanen, Walnut Creek, Calif.; Alpo J. Tokola, Portland, Oreg.

[73] Assignee: Kaiser Steel Corporation, Oakland, Calif.

[21] Appl. No.: 443,003

[22] Filed: Feb. 15, 1974

Related U.S. Patent Documents

Reissue of:

[64] Patent No.: 3,641,774
Issued: Feb. 15, 1972
Appl. No.: 7,182
Filed: Jan. 30, 1970

[51] Int. Cl.[2] ..... E02D 21/00; B63B 35/40; B63C 13/00

[52] U.S. Cl. ..... 61/96; 61/68; 114/265; 114/77 R

[58] Field of Search ..... 61/46.5, 54, 63, 53; 285/27, 24, 22, 21; 182/178; 114/77; 403/13, 14

[56] References Cited

U.S. PATENT DOCUMENTS

| | | | |
|---|---|---|---|
| 651,337 | 6/1900 | Brooksbank | 61/68 |
| 1,025,759 | 5/1912 | McCluskey | 285/27 |
| 1,097,798 | 5/1914 | Girod | 285/27 |
| 1,807,962 | 6/1931 | Cassiere | 61/54 |
| 1,826,377 | 10/1931 | Anderson | 285/21 |
| 2,029,004 | 1/1936 | Varni | 61/46.5 X |
| 2,517,391 | 8/1950 | Ernestus | 285/27 |
| 2,574,140 | 11/1951 | Boschen | 61/46.5 |
| 2,636,354 | 4/1953 | Glassgold | 61/54 |
| 2,857,744 | 10/1958 | Swiger et al. | 61/46.5 |
| 3,094,847 | 6/1963 | Pogonowski | 61/46 |
| 3,370,565 | 2/1968 | Takezawa et al. | 114/77 |
| 3,401,664 | 9/1968 | Furukawa et al. | 114/77 |
| 3,407,771 | 10/1968 | Takezawa et al. | 114/77 |
| 3,421,469 | 1/1969 | Yamada et al. | 114/77 |
| 3,628,336 | 12/1971 | Moore et al. | 61/46.5 |

*Primary Examiner*—Jacob Shapiro

[57] ABSTRACT

Improved method and apparatus for assembling and completing the fabrication of a multilegged structure of extended length at an offshore site wherein separate multilegged structural modules are selectively floated, disposed end-to-end, and aligned relative to each other at the offshore site such that the ends of aligned legs of the individual sections can be drawn and clamped together and then welded while in a clamped condition whereby the several welded-together sections can form an elongated unitary structure.

35 Claims, 9 Drawing Figures

METHOD AND APPARATUS FOR FABRICATING AN OFF-SHORE STRUCTURE

Matter enclosed in heavy brackets [ ] appears in the original patent but forms no part of this reissue specification; matter printed in italics indicates the additions made by reissue.

*This is a reissue of Patent No. 3,641,774 dated Feb. 15, 1972.*

BACKGROUND OF THE INVENTION

Various methods and apparatus that have been devised in the past for fabricating an offshore structure or marine vessel of extended length at an offshore location are exemplified by U.S. Pat. No. 3,407,771 to Takezawa et al., granted Oct. 29, 1968, and U.S. Pat. No. 3,421,469 to Yamada et al., granted Jan. 14, 1969. These prior art methods and apparatus were concerned, however, with fabricating an extended structure at an offshore site which was made up of singular interconnectable structural modules or sections and they are not concerned with or readily adaptable for joining multilegged structures at an offshore site in order to form a unitized elongated structure.

SUMMARY OF THE INSTANT INVENTION

It is the primary purpose of the instant invention to provide an improved and simplified method and apparatus for drawing and securing together at least a pair of floating and interconnectable multilegged offshore structural modules to form an elongated and unitary structure wherein a unique cofferdam device can be used during the joining together of individual pairs of structural leg sections at the offshore site in an improved fashion.

DETAILED DESCRIPTION

Figure 1:
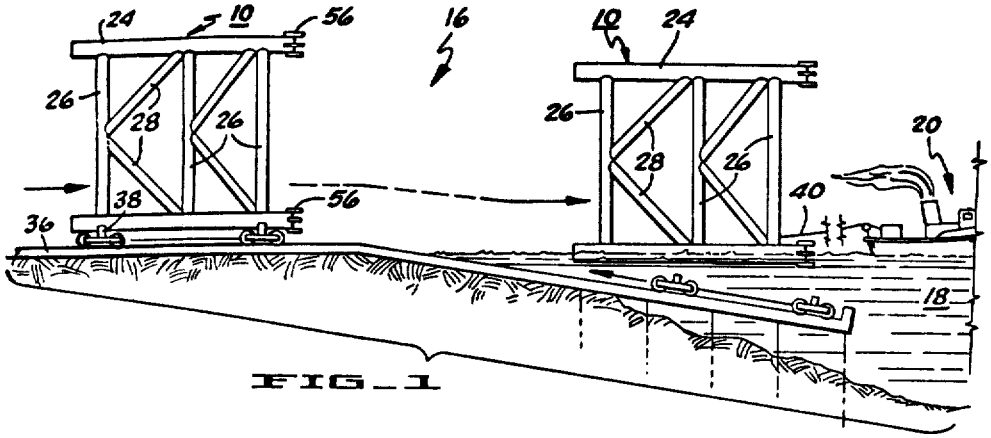
FIG. 1 is an elevational schematic view with parts broken away of a ramp for launching individual multilegged sections in accordance with the teachings of the instant invention.

With further reference to the drawings, and particularly FIGS. 1–4, a preferred embodiment of the instant invention contemplates that a pair of interconnectable multilegged and selectively floatable structural sections 10 can be of watertight construction such as those shown in Swiger et al. U.S. Pat. No. 2,857,744. Each section has substantially the same shape in cross-sectional configuration, and the same dimensions and parts, so that they can be joined together at a preselected offshore site to form with a minimum of delay and inconvenience a unitary multijointed structure 14 in accordance with the teachings of the instant invention. Each section 10 is separately launchable from a dry dock 16 at an onshore site into a body of water 18 such as a harbor, bay or inlet, etc., whence it can be towed, for example, to an offshore site in a conventional fashion such as by a tug 20 all as indicated in FIG. 1.

As will become more apparent hereinafter, the pair of multilegged sections 10 once they are launched are then selectively floated relative to each other at the offshore site such that the legs of the pair of sections 10 are aligned end to end prior to their being progressively and continuously drawn together into clamping engagement to form the extended multijointed offshore structure 14 of FIGS. 2–4. If desired, a cable and winch system 19 can be provided in conjunction with surface vessels or tugs 20 for continuously and progressively drawing the adjacent and aligned ends of a pair of multilegged structural modules 10 together into clamping engagement at the offshore site.

In order to hold the abutting ends of the legs of the multilegged sections in a clamped-together relation during welding, an extendable and lockable clamping device 21 may be attached to each of the abutting leg sections and across the joint therebetween.

Figures 5, 6, 7, 8, 9:
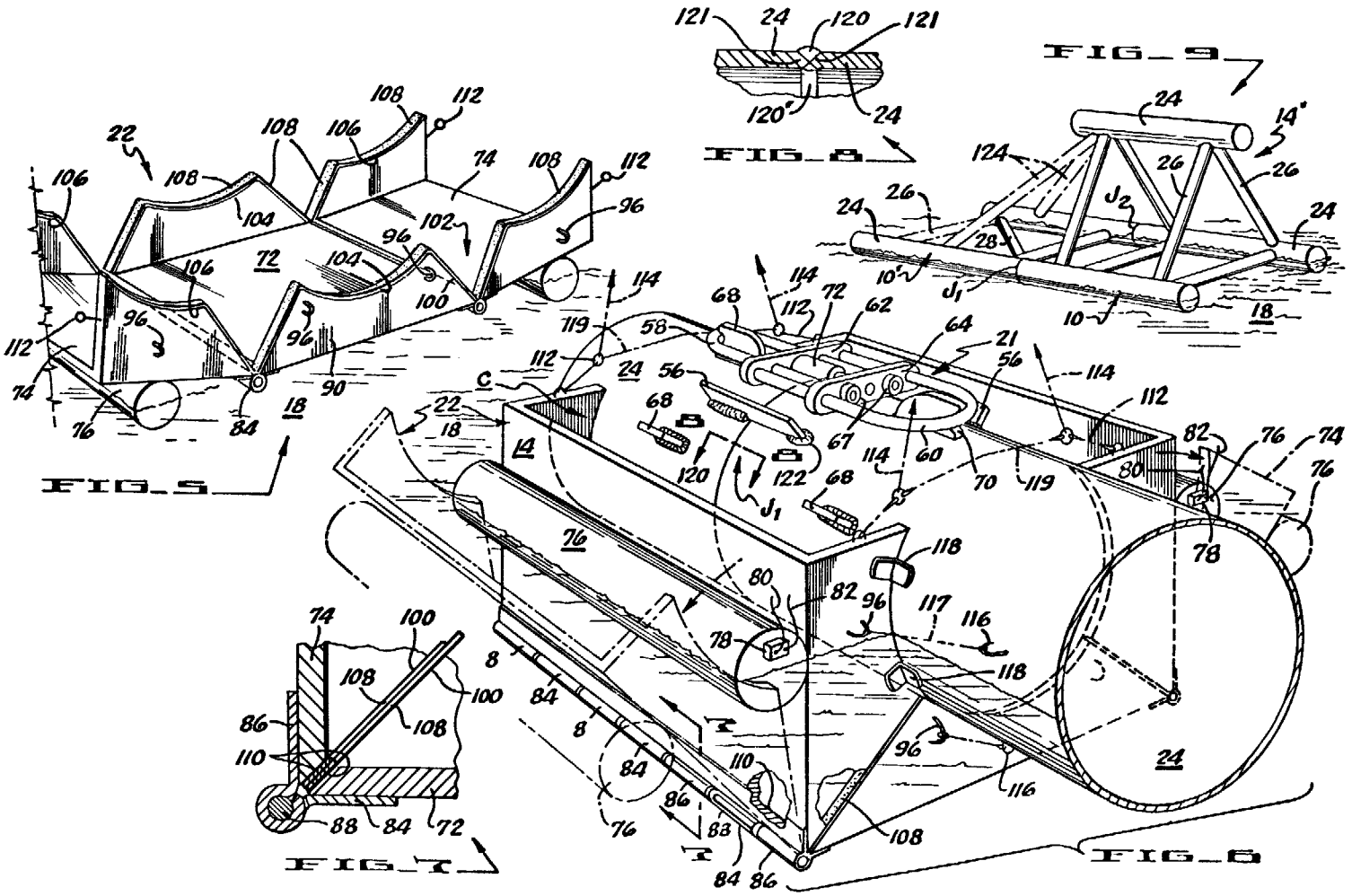
FIG. 5 is a perspective view of a preferred embodiment of a collapsible and floatable cofferdam device of the instant invention.
FIG. 6 is an enlarged fragmentary perspective view with parts broken away of the joint arrangement between a pair of abutting legs of adjoining sections and with a floatable cofferdam device selectively disposed about the pair of abutting legs adjacent the joint thereof, said device being shown in more than one operative position by dotted and solid lines.
FIG. 7 is a cross-sectional view taken along line 7—7 of FIG. 6.
FIG. 8 is an enlarged cross-sectional view taken along line 8—8 of FIG. 6.
FIG. 9 is a perspective view in dotted and solid lines of a slightly modified form of an extended offshore structure that can be fabricated in accordance with the teachings of the instant invention.

In another advantageous embodiment of the instant invention, a novel collapsible and floatable cofferdam device 22 can be employed as a unique welding fixture or jig during formation of a multijointed extended and unitary structure 14 from a pair of aligned structural sections clampingly held together in the manner illustrated in FIGS. 6–8. As indicated in FIG. 9, a slightly modified form of an extended offshore structure 14′ can be comprised of a pair of sections 10 and 10′ each of different configuration.

The primary reason for joining pairs of interconnectable multilegged offshore modules or sections 10 at an offshore site to form extended unitary multijointed offshore structures is due to today's lack of large-sized dry docks as well as transport and towing facilities for exceptionally large sized offshore platforms or towers. After the launching of individual sections 10 from their dry dock 16 or the like, sections 10 are transported or towed to a selected offshore site and joined together at such site. As will be indicated below, the fact that the modules being joined are made up of multiple joined-together legs is an advantage because it provides the extended structure being formed with a desired degree of stability during the joining operation, such as that of a catamaran.

Figure 2:
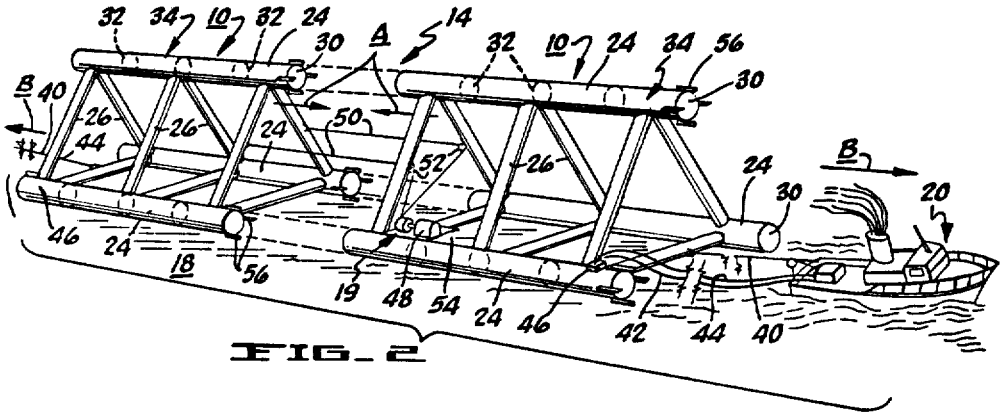
FIG. 2 is a perspective view of a pair of interconnectable and floating structural sections that have been maneuvered at an offshore site into alignment with each other.

In one advantageous embodiment of the invention the modular metal sections 10 making up an extended structure can each be formed from a series of three parallel spaced watertight metal leg elements 24 of substantially equal length and a plurality of transversely extending watertight metal bracing elements 26 extending between and interconnected to adjacent pairs of leg elements 24 in the manner shown in FIGS. 1–2. If desired, a structural section 10 can be provided with additional reinforcing metal elements 28. Each reinforcing element 28 can be arranged to extend between and to be interconnected to intermediate portions of a leg element 24 and a bracing element 26 all as shown in FIG. 1. Elements 24, 26 and 28 of a given structure are preferably made of a suitable grade of steel of circular shape in cross section with leg elements 24 normally being of the largest diameter and the longest length and with reinforcing elements 28 being normally of the smallest diameter and shortest length.

The longitudinal extremities of all leg elements 24 of a structure 10 are preferably closed off in a suitable manner such as by a cover plate 30 to form a watertight structure. A series of spaced and interior baffles 32 may be used to divide each leg element in a manner conventional in the art into a number of individual watertight compartments 34. Compartments 34 for a given module 10 can be selectively and individually flooded or evacuated as the case may be during floating of the structure for reasons more fully discussed hereinafter. A structure 10 can be of an overall triangular shape as indicated in FIGS. 1–4 or of other shapes, e.g., square, rectangular, hexagonal, etc.

The dry dock, at which each section 10 is constructed, can include track elements 36 which extend into and beneath the surface level of the water for a selected depth. A track-mounted carriage or dolly 38 partially shown in FIG. 1 traverses track elements 36. Since the techniques for handling and launching of a given section 10 by means of a carriage 38 at the dry dock are well known and do not constitute any significant part of the instant invention, no further discussion of the same is required.

After being launched by means of carriage 38, a section 10 can be attached to a tug 20 by the usual tow line 40 and towed alone or with another offshore structure similar to structure 10 to a given offshore site.

Although the multilegged structures can be lined up end-to-end and joined in various ways to form an extended structure 14, one advantageous embodiment of the invention contemplates that a pair of structures 10 be initially joined together at the surface level of the body of water 18 at an offshore site in the manner illustrated in FIG. 2. To this end, the service vessels, only one of which is shown in FIG. 2, transport their respective structures 10 by barge or direct towing to the selected offshore site and then maneuver the sections in the water until the various legs thereof are arranged end-to-end and aligned in the manner illustrated in FIG. 2.

Each service vessel 20 can be equipped with flexible hose lines 42 and 44 for supplying air and water under pressure to a conventional valve mechanism 46 mounted on a structure 10. The valve mechanism for a given structure 10 is individually connected through conduits (not shown) to various compartments 34 thereof in a manner well known in the art whereby the valve mechanism can be appropriately operated to selectively supply air or water to the various compartments of the given structure in order to effect controlled flooding or evacuation of one or more compartments as the case may be. As a result of such controlled flooding or evacuation of one or more compartments of any of the structures 10 at the offshore site, the overall ballast of each structure 10 can be readily controlled whereby the legs of the various floating structures 10 at the offshore site can be substantially generally aligned prior to their being progressively drawn together and interlocked with each other preparatory to being finally welded together.

Figure 4:
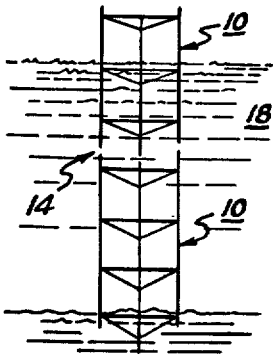
FIG. 4 is a somewhat diagrammatic and side elevational view on a reduced scale of a unitary structure fabricated in accordance with the instant invention and disposed in an installed position at an offshore site.
Figure 3:
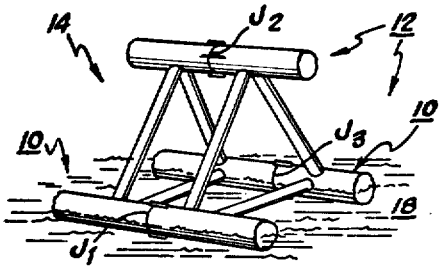
FIG. 3 is a fragmentary perspective view with parts broken away of a finished elongated structure made up of a plurality of individual sections.

When the abutting legs of adjacent sections 10 are welded together, they can form the extended structure 14 having relatively spaced joints $J_1$, $J_2$, and $J_3$ disposed intermediate the ends thereof as shown in FIGS. 2–4.

Novel means are provided for drawing the aligned and adjacent ends of the three sets of leg elements together. In this instance as each service vessel 20 gently nudges its associated section 10 into place, a winch and cable system 19 connected to both sections can be operated at the same time to assist in progressively drawing the aligned ends of the three adjoining sets of leg elements 24 of two structures 10 into clamping engagement to initially form a multijointed structure 14.

Cable and winch system 19 can be generally comprised of a power driven winch 48, a pair of flexible cables 50 and a plurality of pulleys 52. Winch 48 can be mounted on a temporary platform 54 which in turn is appropriately anchored to the left end of right-hand structure 10 as viewed in FIG. 2. The outer ends of cables 50 are wrapped about their respective pulleys and connected to intermediate portions of certain end bracing elements 26 of the left-hand structure 10 as shown in FIG. 2. When cable and winch system 19 is connected to both structures 10, as aforedescribed, the winch is operated to windup the extended lengths of the pair of cables so as to correspondingly draw the adjacent ends of the legs 24 of aligned structures 10 towards each other in a progressive and continuous manner, all as indicated by the opposing arrows A in FIG. 2.

Instead of the tugs 20 pushing the sections 10 together, they can be operated in such fashion whereby they create propelling forces which act against the water for counteracting to a certain extent the action of cables 50 in progressively and continuously drawing the adjacent leg ends of the aligned structures 10 together. For example, each vessel 20 through its tow line 40 can exert a propelling force as indicated by arrow B in FIG. 2 on its associated structure 10 in a direction opposite to and somewhat less in amount than the pulling force being simultaneously exerted by cables 50 thereon during operation of winch 48 as it winds-up cables 50. The result of the surface vessels and the cables 50 exerting opposed and differential forces on their associated structures 10 is that the legs to be joined of structures 10 will be kept in aligned relation as the modular structures 10 are progressively and continuously drawn together and into clamping engagement. One of the reasons for the surface vessels 20 and the pair of cables 50 advantageously exerting counteractive but unequal pulling forces on the structures 10 as described above is because unless this type of pulling takes place the adjacent aligned ends of the pair of structures might otherwise tend to become misaligned or possibly collide at a relatively high impact by virtue of the action of wind and/or wave at the offshore site during the lining up and linking of sections 10. A high impact collision of the structures during the time they are being drawn together could cause serious damage to or deformation of the legs of either one or both of the structures 10 that would prohibit the proper welding of the legs and formation of an extended structure 14 at the offshore site.

In order to further facilitate the drawing of the adjacent ends of the pair of aligned structures together particularly as the adjacent ends come into relatively close proximity to each other, certain leg ends of each structure 10 during its construction at the dry dock can be advantageously provided with a plurality of guide elements, e.g., four such elements 56. Elements 56 can be disposed on the end of at least one of the main metal leg elements 24 whereby these guide elements stick out from their associated leg. Each guide element 56 can be comprised of a relatively narrow elongated metal steel strip 56 welded to the leg 24. When four guides 56 are used, they are preferably affixed in equally spaced relation or 90° apart about the periphery of a leg end 24 in such fashion that the four strips 56 are disposed longitudinally of the leg in concentric relation to the longitudinal axis thereof. The inner longitudinal edge of strip 56 is welded to an outer peripheral portion of the leg so that the opposing outer end of the strip can project outwardly of an overlap a leg end all in the manner illustrated in FIGS. 1–4 and 6. By reason of strips 56 projecting beyond the outer end of their associated leg, the inner longitudinal edges of the strips advantageously function to slidably engage certain peripheral surface portions of the adjacent and aligned leg end of one of the three leg ends of the other structure to be joined during drawing of the pair of structures 10 together at the offshore site. Such slidable engagement between adjacent and aligned leg ends of a pair of structures 10 provides for positive alignment between the adjacent leg ends during stages at which a pair of sections are drawn together so that they can be clamped and held together during the final welding operation.

It is to be understood in order to assure slidable engagement without binding between the inner outwardly projecting edges of the guide elements on the leg of one of the structures of the pair of structures and the cooperating peripheral surface portions of the adjacent and aligned leg end of the other structure, that the inner outwardly projecting edge of a guide can be tapered in a radially outward direction. In addition and, if desired, each end of a leg 24 instead of only one leg end thereof can be provided with guide strips 56 so long as the guide strips at one end of the leg are out of phase or alignment with the strips 56 on the leg of an adjacent structure that is being joined to said first leg.

As indicated in FIG. 6, a portable clamping device 21 can be releasably attached to the adjoining and abutting leg 24 of a pair of structures 10 at a given joining $J_1$ in order to hold these legs in clamped engagement until they are finally welded together. The device is generally comprised of two U-shaped elements 58 and 60 of different widths but of substantially the same lengths and a pair of strap elements 62 and 64. Each strap element is provided with a series of four longitudinally spaced apertures. The leg ends of the U-shaped elements 58 and 60 are disposed in opposed relation such that element 58 of smaller width is disposed within the larger U-shaped recess of element 60. Leg ends of the wide U-shaped element 60 are slidably inserted through the outer two apertures in the series of four apertures of both strap elements 62 and 64 while leg ends of the narrow U-shaped element 58 are slidably inserted through the inner two apertures of the apertures in both strap elements 62 and 64. Strap element 62 is adjustably affixed to U-shaped element 60 by conventional locknut assemblies, not shown, threadably connected in a well-known manner to the outer leg ends of U-shaped element 60 on the exterior face of the strap element. Similarly, strap element 64 is adjustably affixed to U-shaped element 58 by conventional locknut assemblies 67 threadably connected to the outer leg ends of U-shaped element 58 on the exterior face of strap element 64.

In order to effect attachment of a clamping device 21 across the adjoining leg ends of a given joint between two sections 10 such as joint $J_1$ each adjoining leg end is provided with a series of four outwardly projecting radial anchoring lugs 68 disposed adjacent the given joint and disposed in equally spaced relation about the periphery of the leg end. The two series of four lugs provided on adjoining leg ends at a given joint are longitudinally aligned in pairs and interposed between an adjacent pair of guide elements 56 so as to provide adequate clearance for attachment of clamping device 21 between a pair of longitudinally aligned lugs 68 across joint $J_1$ in the manner illustrated in FIG. 6. As depicted in FIG. 6, all lugs 68 for a given joint $J_1$ are provided with U-shaped grooves 70 adapted to receive an intermediate portion of the web end of a U-shaped element 58 or 60 of device 21 during its attachment to a pair of longitudinally aligned lugs as will now be described.

An extensible fluid actuator 72 is interposed between and connected to opposed sides of strap elements 62 and 64 and between leg ends of the narrow U-shaped element 58 whereby the opposed outer ends of strap elements 58 and 60 can be controllably expanded and contracted relative to each other. When the opposed web ends of U-shaped elements 58 and 60 are loosely placed over an aligned pair of lugs 68 and the actuator 72 extended by a control circuit (not shown) clamp device 21 will be drawn into locking engagement across its associated pair of longitudinally aligned lugs 68 thereby positively holding the adjoining leg ends in clamping engagement at joint $J_1$. Depending upon the clamping pressure required at a given joint, it is to be understood that one or more clamp devices 21 can be placed about and across the joint.

When the adjacent ends of all three sets of adjoining legs of the pair of structures 10 are drawn into and held in clamping engagement, such as by the cable and winch system and fluid actuators aforedescribed, to initially form an extended structure 14 having three joints $J_1$, $J_2$, and $J_3$, sections 10 making up structure 14 will remain fully clamped together despite the action of wind and/or wave against the lengthened structure at the offshore site. If a wind or wave load acts to loosen the interconnection of the elements at one joint, e.g., joint $J_1$, the interconnecting elements of the other two joints will resist such action. In addition, the various bracing members 26 and 28, etc., provide a leverage system between the elements making up the three joints whereby such elements at any two of the three joints will cooperate to effectively resist separation of the sections 10 at the other one of the three joints when subjected to a wind and/or wave action. Since the extended structure is of an open gridlike configuration, the total surface area of the extended structure presented to wind and/or wave action is minimal for the overall size of the structure itself thereby effectively limiting the adverse effect of the forces acting on any one of the three joints $J_1$, $J_2$, and $J_3$. At the same time, since the open gridlike structure is of a triangular shape in cross section, its configuration advantageously contributes to the stability of the structure when floating on the surface of the water at the offshore site. Thus, the gridlike structure is being of triangular shape in cross section and in presenting a minimal surface area relative to its overall size advantageously enhances the stability of the structure as well as the ability of the structure to effectively resist separation of its parts at any one of the three joints thereof when the extended structure is subjected to a wind and/or wave load at the offshore site.

Depending upon the overall strength requirements of the structure as ultimately used, the elements at one or more of the three joints can be rigidly secured together such as by welding or by metal splice plates that are overlapped, riveted and sealed to two abutting legs 24. Although attachment of each of the legs in the three joints to each other could be effected by standard welding procedures, a preferred embodiment of the invention, as will now be described, contemplates the use of a cofferdam device 22 during welding, such as arc-welding.

Device 22 can be comprised of an intermediate saddlelike element or section 72 and two outer elements or end sections 74 all hingedly interconnected together. Each section 72 or 74 is of approximately channel-shaped configuration. A pontoon element 76 is preferably affixed to the backside of the web of each end section 74 and can be of an inflatable or rigid construction. Flexible lines 80 and 82 are connected in a conventional fashion at their ends to separate sources of air and water (not shown) and to a valve mechanism 78 mounted on each one of the pontoon elements. It is to be understood that the valve mechanism can be operated for selectively admitting air and water from supply lines 80 and 82 in order to control flooding or evacuation of a given pontoon whereby the buoyancy of the pontoons can be regulated so as to cause device 22 to float at a desired height above or relative to the surface of the water as illustrated in FIGS. 5 and 7.

The free edges of the webs of sections 72 and 74 are provided with the usual interfitting cooperating and apertured hinge elements 84 and 86 that are adapted to receive the usual hinge pin 88.

Adjacent flange edges 100 of adjoining sections 72 and 74 extend upwardly and outwardly relative to each other so as to define a V-shaped groove 102 therebetween when the device is in the extended position of FIG. 5. Top flange edges 104 and 106 of the intermediate and end sections 72 and 74 on opposite sides of the device are of arcuate-concave configuration. The radius of the arc of flange edges of each section 72 and 74 approximates that of the legs 24 of the pair of structures 10 to be joined.

Resilient and flexible sealing strips 108 of a suitable grade of rubber or rubberlike material are preferably attached to adjacent side edges 100 of adjoining sections 72 and 74 at either end of device 22, as well as to top edges 104 and 106 of all sections of device 22. Similar strips 110 are attached to adjacent web edges of intermediate section 72 and either end section 74 in the manner illustrated in FIGS. 6–7. Thus, when device 22 is placed in watertight engagement about a predetermined part of extended structure 14, strips 108 of the top edges 104 and 106 of the flange of sections 72 and 74 will be in abutting sealing engagement with certain peripheral surface portions of a predetermined part of structure 14 while strips 108 of adjacent side edges 100 of the flanges of adjoining sections will be in abutting and sealing engagement with each other. At the same time, strips 110 will be in abutting and sealing engagement between adjacent web edges of the intermediate section and either one of the adjoining end sections 74.

As indicated in FIGS. 5–6, outer end edges of the flanges of end sections 74 at opposite ends of device 22 are preferably provided with a pair of pivotally connected eyelet [assembles] *assemblies* 112. These eyelet assemblies 112 at the outer end edges of a given end section 74 facilitate selective connection of one or more cable lines to the outer end edges thereof so as to enable transporting of the device to the offshore site such as by a service vessel, not shown, or placement or folding of the device about a predetermined part of the extended structure for selectively engaging and isolating the same from the water as will now be discussed.

At the offshore site, device 22 is lowered from the surface vessel (not shown) into the water in an appropriate manner. Upon lowering of the device into the water, pontoons 76 connected thereto are selectively and controllably flooded until the device is suitably floated in the water, as indicated in FIG. 5. Although device 22 is illustrated in FIG. 5 in an extended position substantially on top of the water, it is to be understood that in actual practice the cofferdam device upon being lowered into the water will probably be partially submerged by selective flooding of the tanks or pontoons 76. As the result of the partial submergence of the device at the offshore site, end sections 74 thereof may tend to pivot upwardly and inwardly in opposite directions relative to each other towards the top or channel-shaped recess of intermediate section 72 whereby the device will be usually in a somewhat collapsed rather than the extended position shown in FIG. 5 when presented to the elongated structure 14.

Various methods can be employed for emplacing partially submerged device 22 about the parts forming a given joint $J_1$ of structure 14. To this end, various chambers in the chambered pontoons 76 of the device are selectively flooded and/or evacuated by way of the valves 78 in order to first sink the device 22 to a level below the bottom of joint $J_1$ of structure 14. It is to be understood of course that device 22 will also have being advanced through the water in a suitable manner until it can be disposed beneath the section parts making up joint $J_1$. A series of cables 114, usually four, suspended from a hoist (not shown) and mounted on a barge (also not shown) is disposed on opposite sides of adjoining legs 24 at the abutting ends thereof which form the joint so that the lower ends of the four cables can be connected to eyelets 112. When cables 114 are hoisted upwardly upon operation of the hoist (not shown), submerged device 22 can be correspondingly hoisted upwardly until it fits about the abutting ends of adjoining legs 24 at joint $J_1$, in the manner illustrated in FIG. 6.

During the maneuvering of the submerged device toward and about the outer peripheral portions of the legs in the area of the selected joint of the structure by means of cables 114 of the hoist (not shown) in order to isolate the joint area from the surrounding water pontoons 76 can be selectively evacuated to increase the buoyancy of the device. If necessary, a plurality of circumferentially spaced U-shaped brackets 116 can be provided on the adjoining legs 24 of structure 14 and a plurality of U-shaped brackets 96 can be attached to outer surface portions of various flanges of sections 72 and 74 of device 22 whereby cables 117 as indicated by dotted lines in FIG. 6 can extend between brackets 116 and 96 so as to further tiedown the device relative to structure 14 during placement of the device thereabout. As indicated in FIGS. 5–6, device 22 is advantageously of such a size whereby while partially embracing the extended structure at joint $J_1$ it will also extend well above the top surface of the water.

L-shaped bracket assemblies 118 may be provided for anchoring the cofferdam device 22 to the structure when the device is in engagement therewith, as illustrated in FIG. 7. Cables 119, as indicated by dotted lines in FIG. 6, can extend between eyelet assemblies 112 so that device 22 is securely held in watertight engagement about the periphery of the structure in the area of the joint. The open-ended chamber C defined by opposed portions of device 22 and structure 14 can be evacuated of water by an appropriate pump device (not shown) whereby the operator can enter the water-free chamber in order to weld the section 10 together by way of fillet welds 120 in the joint $J_1$.

As indicated in FIG. 8, the abutting edges of adjoining legs of a given joint $J_1$ of structures 10 can be advantageously provided with aligned beveled edge portions 121 preferably on opposite sides of the abutting edges of adjoining legs in the area of the joint $J_1$. The beveled edge portions define opposed depressions or valleys for receiving individual deposits of welding material during formation of weldments 120 on opposed sides of the abutting edges of adjoining legs 24 at joint $J_1$.

A preferred method of welding the abutting ends of adjoining legs of the joint together will now be set forth. The operator by an appropriate arc-welding tool (not shown), selectively first makes spaced tack welds on abutting beveled edge portions 121 on either the inside or outside of adjoining legs of the structures at a joint $J_1$ thereof after the abutting edges of the opposing legs have been disposed in the desired opposed positions. After making spaced tack welds, so as to temporarily lock the various elements together, the operator can next completely form a weld bead 120 about the entire circumference of abutting ends of adjoining legs of the structures on opposite sides thereof as shown in FIGS. 6 and 8. Prior to tack welding the abutting edges of adjacent legs of structures 10, overlapping longitudinal edges of guide elements 56 may be tack welded or otherwise seam welded, as indicated at 122 in FIG. 6, to the overlapped leg of adjoining legs of structures 10 at the joint thereof thereby enabling guide elements 56 to additionally function as splice plates during the final precision welding of the joint. In order that proper engagement is assured between abutting edges of adjacent ends of adjoining legs of structures 10, an extensible actuator 72 of one or more clamping devices 21 is maintained at a predetermined pressure by a control circuit (not shown) despite any separation or compression forces acting across the joint at the offshore site during formation of the structure. Thus, the guide elements 56 in conjunction with one or more clamping devices 21 across a given joint guarantee formation of a precise sound and generally uniform welding of the entire joint that will meet the overall strength requirements of an extended structure 14 as ultimately used at an offshore site.

After final welding of the adjoining legs at each joint in the fashion aforedescribed of all legs and structures 10 and disconnection of device 22 from structure 14, extended structure 14 is made up of two or more sections 10 can be upended and lowered into the body of water at the offshore site upon selective flooding of legs 24 thereof. The lower end of the upended structure can be anchored to the earth's surface beneath the body of water in a manner well known in the art.

In another advantageous embodiment of the instant invention, a slightly modified form of extended structure 14' having two joints $J_1$ and $J_2$ is generally comprised of a pair of structural sections 10 and 10' each of different cross-sectional configuration as shown in FIG. 9. Reinforcing elements 124 extending between and interconnected to certain portions of the pair of sections 10 and 10' can be provided to increase the overall strength of the extended structure upon fabrication thereof at the offshore site in accordance with the teachings of the instant invention.

Although the polyhedrally shaped structural sections of extended structure 14 or 14' have been of generally triangular configuration in transverse section, they could be of any suitable polyhedral shape in transverse section such as rectangular, square, hexagonal, etc.

Advantageous embodiments of the instant invention have been disclosed and described. It is obvious that various changes and modifications may be made therein without departing from the appended claims, wherein:

What is claimed is:

1. The method of fabricating a modular offshore structure comprising the steps of transporting at least a pair of individual structural modules each of which is made up of interconnected and floatable watertight legs from an onshore site to a preselected offshore site, then while the said pair of modules are partially submerged in water at the offshore site selectively controlling the ballast in the watertight legs of each module of the pair of modules and maneuvering said pair of modules relative to each other until the legs of one module are fully aligned with the legs of the other and opposed module, progressively drawing said aligned legs of the pair of opposed modules together until they are abutted, and while holding the abutted legs of the modules firmly clamped together rigidly securing one leg of a pair of abutted legs to the other leg of said pair of legs.

2. A method as set forth in claim 1 wherein the legs of said pair of legs are rigidly secured together by first tack welding the legs of said pair of legs together and subsequently fully welding the said pair of legs together.

3. A method as set forth in claim 1 including the step of isolating the said pair of abutted legs of opposed modules from the surrounding water prior to rigidly securing said pair of legs together.

4. A method as set forth in claim 3 wherein the legs of the said pair of abutted legs are rigidly secured together by arc welding the same together.

5. A method as set forth in claim 3 wherein the step of isolating the abutted pair of legs from the surrounding water is effected by surrounding the abutted legs with a collapsible cofferdam in the area of the joint between the legs, drawing the pairs of said cofferdam together about the abutted legs and then evacuating the water from the compartment formed by said cofferdam.

6. A method as set forth in claim 1 wherein said abutted legs are clampingly held together by firmly engaging each of said legs with opposing parts of a clamping device and then drawing said opposing parts of the device together.

7. A method as set forth in claim 1 wherein opposed modules are maneuvered and drawn together at least in part by drawing upon cables attached to each module of said pair of modules.

8. A method as set forth in claim 1 including the step of locking adjustable clamping elements to each of said modules of said pair of modules in order to clamp the abutted legs of the modules together.

9. A method as set forth in claim 1 including the step of fillet arc welding the abutted legs of opposed modules together after clamping said abutted legs to each other.

10. A method as set forth in claim 1 including the step of floating said modules to the offshore site.

11. A method as set forth in claim 1 wherein the aligned legs of the pair of modules are drawn together by drawing up on cables attached to each of the opposed modules while at the same time exerting module separating forces on the modules which are of less magnitude than the forces exerted on the modules by the cables.

12. The method as set forth in claim 1, including the step of installing the modular structure at the preselected offshore site.

13. A collapsible and floatable cofferdam device for engaging and isolating a pair of abutted legs on adjacent modular platform sections in the area of the joint between the pair of legs from the surrounding water at an offshore site, said device comprising a plurality of generally channel-shaped and interconnected elements, opposed edges of adjoining web portions of adjacent elements of the plurality of elements being hingedly interconnected together so as to effect opening and closing of the plurality of elements from an extended condition to a collapsed condition and vice versa, the opposed side edges of adjoining flange portions of adjacent elements being adapted to be separated from each other in order to define a groove therebetween when adjacent elements of the plurality of elements are in an extended condition, said opposed side edges at the adjoining flange portions of said elements being adapted to be disposed in abutting and sealing engagement with each other and the platform sections upon adjacent elements of the plurality of elements being in a collapsed condition, and pontoon means connected to certain of said elements for controlling the overall buoyancy of the plurality of elements during flotation and collapse of the plurality of elements about the pair of abutted legs at an offshore site.

14. A collapsible and floatable cofferdam device as set forth in claim 13 including means on said cofferdam device for anchoring said device to said modular platform sections.

15. A collapsible and floatable cofferdam device as set forth in claim 13 including a flexible and resilient gasket element carried by the upper edge of a flange portion of a given element of said device for sealing the upper edge of the flange portion of the given element to a leg of said pair of legs.

16. A collapsible and floatable cofferdam device as set forth in claim 13 including a flexible and resilient gasket element carried by the side edge of a flange portion of a given element for sealing the side edge of the flange portion of a given element to the opposed side edge of an adjoining flange portion of an adjacent element with the plurality of elements are in a collapsed condition.

17. A collapsible and floatable cofferdam device as set forth in claim 13 including a flexible and resilient gasket element carried by an edge of the web portion of a given element for sealing the edge of the web portion of the given element to the opposed edge of an adjoining web portion of an adjacent element when the adjacent and given elements are in a collapsed condition.

18. A collapsible and floatable cofferdam device as set forth in claim 13 including means operatively associated with each one of the plurality of said elements for drawing the upper edge of a flange portion of a given element into sealing engagement with selected surface portions of a given leg of the pair of abutted legs.

*19. A cofferdam element for a collapsible and floatable cofferdam device used for isolating from the surrounding water at an offshore site a pair of abutted legs of adjacent modular platform sections in the area of the joint between abutted legs, said cofferdam element comprising a web portion having first, second, third and fourth web edges, said first and third web edges and said second and fourth web edges, respectively, being in opposed relationship to one another, first and second hinge means located separately along said first and third web edges for hingedly connecting said cofferdam element with a pair of flanking cofferdam elements, first and second upstanding flange portions attached in watertight relationship to said web portion along said second and fourth web edges, each of said flange portions comprising a first and second flange edge each originating respectively at said first and third web edges and terminating at a top edge of each of said upstanding flange portions, at least a portion of each of said top edges being configured to closely conform with the cross-sectional configuration of at least a portion of the underside of the legs of the tower section, web edge sealing means positioned along said first and third web edges to sealingly engage with web edges of said flanking cofferdam elements, flange edge sealing means positioned along said flange edges to sealingly engage with flange edges of said flanking cofferdam elements, and top edge sealing means positioned at said top edge to sealingly engage with the outer surface of said tower leg.*

*20. The cofferdam element of claim 19 further comprising means for drawing said top edge sealing means into pressure engagement with said outer surface of said tower leg.*

*21. The cofferdam element of claim 19 wherein said web portion is substantially planar and is adopted to be substantially horizontally oriented when in engagement with said tower legs.*

*22. The cofferdam element of claim 19 further comprising pontoon means for controlling the overall buoyancy of said element during flotation thereof.*

*23. The cofferdam element of claim 19 further comprising means for anchoring said cofferdam element to said modular platform section.*

*24. A cofferdam element for a collapsible and floatable cofferdam device used for isolating from the surrounding water at an offshore site a pair of abutted legs of adjacent modular platform sections in the area of the joint between abutted legs, said cofferdam element comprising a web portion having first, second, third and fourth web edges, said first and third web edges and said second and fourth web edges, respectively, being in opposed relationship to one another, hinge means located along said first web edge for hingedly connecting said cofferdam element with another flanking cofferdam element, first and second upstanding flange portions attached in watertight relationship to said web portion along said second and fourth web edges, each of said flange portions comprising a first flange edge originating at said first web edge and terminating at a top edge of each of said upstanding flange portions, at least a portion of each of said top edges being configured to closely conform with the cross-sectional configuration of at least a*

*portion of the side of the legs of the tower section, each of said flange portions further comprising a second flange edge originating at said third web edge and extending substantially perpendicularly to said web portion and terminating at said top edge, web edge sealing means positioned along said first and third web edges to sealingly engage with web edges of said flanking cofferdam elements, flange edge sealing means positioned along said first flange edges to sealingly engage with flange edges of said flanking cofferdam element, and top edge sealing means positioned at said top edge to sealingly engage with the outer surface of said tower leg.*

*25. The cofferdam element of claim 24 further comprising means for drawing said top edge sealing means into pressure engagement with said outer surface of said tower leg.*

*26. The cofferdam element of claim 24 wherein said web portion is substantially planar and is adapted to be substantially vertically oriented when in engagement with said tower legs.*

*27. A floatable module which is floatable to an offshore assembly site in horizontal orientation to be attached while horizontal to at least one other said module and then upturned to vertical orientation and emplaced, each said module comprising a series of laterally spaced floatable watertight leg elements and a plurality of brace elements interposed therebetween and interconnected to the series of spaced leg elements to form a module of polyhedral configuration, guiding and aligning means adapted to facilitate the abutting and joining of the ends of said leg elements of adjacent of said modules while said leg elements are horizontally oriented and floating in the water, said guiding and aligning means comprising a plurality of guide strip elements spaced about the outer peripheral portion of at least one of said leg elements at the end thereof, said guide strip elements extending outwardly beyond said leg end generally horizontally to receive therebetween the leg end of an adjacent of said modules to be brought into abutting relationship therewith, said guide strip elements being of such length as to guide and align the leg end of the adjacent leg elements during at least the final portion of movement of said leg end into abutting relationship, and an upstanding lug attached near the end of a leg in opposed relationship to a leg on an adjacent one of said modules to facilitate the attachment of a clamping device between said legs when the adjacent ends of the legs are drawn into abutment to form an extended structure.*

*28. The structure of claim 27 further comprising attachment means on said module for permitting attachment of means for pulling together adjacent of said modules from positions spaced from one another to a position wherein said leg elements are substantially in abutting relationship with one another.*

*29. A module as set forth in claim 27 in which said module is comprised of a series of three laterally spaced legs to form a module of triangular shape in transverse section.*

*30. A module as set forth in claim 27 in which said opposed lugs are interposed between adjacent strip elements of said series of strip elements associated with the pair of adjacent and longitudinally aligned leg elements.*

*31. A module as set forth in claim 27 in which adjacent and abutted leg ends of adjoining modules are rigidly secured together upon forming a weldment between abutted leg ends thereof.*

*32. A floatable module which is floatable to an offshore assembly site in horizontal orientation to be attached while horizontal to at least one other said module and then upturned to vertical orientation and emplaced, each said module comprising a series of laterally spaced floatable watertight leg elements and a plurality of brace elements interposed therebetween and interconnected to the series of spaced leg elements to form a module of polyhedral configuration, guiding and aligning means adapted to facilitate the abutting and joining of the ends of said leg elements of adjacent of said modules while said leg elements are horizontally oriented and floating in the water, and attachment means on said module for permitting attachment of means for pulling together adjacent of said modules from positions spaced from one another to a position wherein said leg elements are substantially in abutting relationship with one another.*

*33. A floatable module which is floatable to an offshore assembly site in horizontal orientation to be attached while horizontal to at least one other said module and then upturned to vertical orientation and emplaced, each said module comprising a series of laterally spaced floatable watertight leg elements and a plurality of brace elements interposed therebetween and interconnected to the series of spaced leg elements to form a module of polyhedral configuration, guiding and aligning means adapted to facilitate the abutting and joining of the ends of said leg elements of adjacent of said modules while said leg elements are horizontally oriented and floating in the water, and means to move adjacent of said modules, while the leg elements are in horizontally oriented position, from positions spaced from one another to a position wherein the leg elements are substantially in abutting relationship with one another.*

*34. A module as set forth in claim 33 in which said module is comprised of a series of three laterally spaced legs to form a module of triangular shape in transverse section.*

*35. A module as set forth in claim 33 in which adjacent and abutted leg ends of adjoining modules are rigidly secured together upon forming a weldment between abutted leg ends thereof.*

* * * * *